United States Patent [19] [11] 3,880,779
Unoura et al. [45] Apr. 29, 1975

[54] POLYMERIZATION PROCESS OF VICINAL ALKYLENE OXIDES AND POLYMERIZATION CATALYST THEREFOR

[75] Inventors: Kinya Unoura, Amagasaki; Atsushi Oda, Toyonaka; Yoshimasa Hayashi, Amagasaki; Nobuhiro Kimura, Itami; Tetsuya Nakata, Ibaraki; Shingo Tokuda, Nishinomiya, all of Japan

[73] Assignee: Osaka Soda Co., Ltd., Osaka, Japan

[22] Filed: Apr. 12, 1971

[21] Appl. No.: 133,430

[30] Foreign Application Priority Data
Oct. 30, 1970 Japan.............................. 45-96044

[52] U.S. Cl............ 260/2 A; 260/2 EP; 260/18 PF; 260/47 EP; 260/78.4 EP; 260/88.3 A; 260/429 R; 260/429.3; 260/429.5; 260/429.7; 260/448 A; 260/448 R; 260/448.2 R; 260/613 B; 260/615 B
[51] Int. Cl............................................ C08g 23/14
[58] Field of Search.. 260/2 EC, 2 A, 615 B, 613 B, 260/448 R, 448 A, 88.3 A, 18 PF, 18 EP, 47 EP, 78.4 EP; 252/431 P, 437

[56] References Cited
UNITED STATES PATENTS
| | | | |
|---|---|---|---|
| 3,018,258 | 1/1962 | Meier et al. | 260/2 X |
| 3,636,163 | 1/1972 | Jenkner et al. | 260/615 |
| 3,657,159 | 4/1972 | Vandenberg | 260/2 |

*Primary Examiner*—William H. Short
*Assistant Examiner*—T. Pertilla
*Attorney, Agent, or Firm*—Sherman & Shalloway

[57] ABSTRACT

An improved process for polymerizing vicinal alkylene oxides in the presence of a catalyst comprising the reaction product of an aluminum or tin compound of the formula (i) $R_nAlX_{3-n}$, (ii) $R'_mMX_{4-m}$ or (iii) $SnX_2$ wherein the variables are as defined in the specification and one of a phosphorus-containing compounds of the (1)–(12) members specified in the specification.

9 Claims, No Drawings

POLYMERIZATION PROCESS OF VICINAL ALKYLENE OXIDES AND POLYMERIZATION CATALYST THEREFOR

This invention relates to catalyst for polymerizing vicinal alkylene oxides which shows high catalytic activity for wide varieties of vicinal alkylene oxides and excellent stability, is easy to handle in such procedures as preparation, storage, use in polymerization system, and is capable of promoting the polymerization at relatively low temperatures with reduced catalytic amount compared with conventional catalysts, to provide polymers of desired molecular weights and crystallinity varying over a wide range, i.e., from amorphous to crystalline state; and also to the polymerization of vicinal alkylene oxides using such catalyst.

More particularly, the invention relates to a process for polymerizing or copolymerizing vicinal alkylene oxides in the presence of a catalyst to form the corresponding homo- or co-polymers, characterized in that the reaction is performed in the presence of the reaction product of below-specified reactants (I) and (II) as the catalyst, i.e. the reaction product of at least one of the following reactant (I) of the formulae (i) through (iii):

(I). aluminum compounds of the formula, $$R_nAlX_{3-n}$$

(i)

[in which R is selected from the group consisting of alkyl radicals, preferably alkyl radicals of 1–8 carbon atoms, particularly 1–4 carbon atoms, alkoxy radicals preferably alkoxy radicals of 1–8 carbon atoms, more preferably 1–6 carbon atoms, inter alia, 1–4 carbon atoms; and aryl radicals, preferably phenyl; X is a halogen atom, preferably a member of the group consisting of chlorine, bromine, and iodine; and $n$ is an integer of 0–3]; Group IV metallic compounds of the formula, $$R'_mMX_{4-m}$$

(ii)

[in which M is a metal selected from Group IV metals of the periodic table having an atomic number ranging from 14–72 (Ti, Zr, Hf, Si, Ge, and Sn), when M is a metal of Group IVa (typical elements), R' is a member of the group consisting of alkyl radicals, preferably alkyl radicals of 1–8 carbon atoms, inter alia, 1–4 carbon atoms; alkenyl radicals, preferably alkenyl radicals of 1–8 carbon atoms, inter alia, 1–4 carbon atoms; alkoxy radicals, preferably alkoxy radicals of 1–8 carbon atoms, particularly 1–6 carbon atoms, inter alia, 1–4 carbon atoms; aryl radicals, preferably phenyl; and aralkyl radicals, preferably benzyl; and when M is a metal of Group IVb transition metals, R' is an alkoxy radical: X is a halogen atom, preferably selected from the group consisting of chlorine, bromine and iodine: and m is an integer of 0–4]; and tin dihalides of the formula $$SnX_2$$

(iii)

[in which X is a halogen atom, preferably selected from the group consisting of chlorine and bromine] with at least one reactant (II) composed of a phosphorus-containing compound of one of the following 12 groups:

(II)

(1)

$$(R''O)_3PO$$

(1)

[in which R'' is selected from the group consisting of hydrogen, alkyl of 1–12 carbon atoms preferably 2–8 carbon atoms; halogenated alkyl of 1–12 carbon atoms, preferably 2–4 carbon atoms; alkenyl of 1–12 carbon atoms, preferably 2–4 carbon atoms; and cycloalkyl of 5–7 carbon atoms, which may have alkyl or alkenyl side chains of 1–4 carbon atoms; at least one of the R''s being an organic radical selected from the above groups and plural R''s optionally being the same or different]

(2)

$$Z(R''O)_2PO$$

(2)

[in which R'' has the same meaning as described in connection with formula (1), and Z is a radical selected from the group consisting of alkyl of 1–8 carbon atoms, preferably 1–6 carbon atoms, and aryl, preferably phenyl]

(3)

$$Z_2(R'''O)PO$$

(3)

[in which R''' has the same meaning as described in connection with R'' of formula (1) except the hydrogen atom, and Z has the same meaning as described in connection with formula (2), the plural Z's optionally being the same or different]

(4)

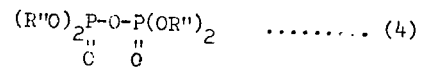

[in which R'' has the same meaning as described in connection with R'' of formula (1)]

(5)

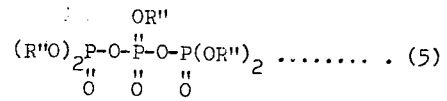

[in which R'' has the same meaning as described in connection with R'' of formula (1)]

(6)

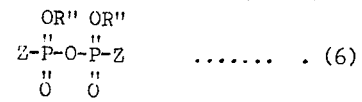

[in which R'' and Z each have the same meaning as described in connection with R'' of formula (1) and Z of formula (2), respectively, the plural Z's optionally being the same or different]

(7)

(R''O)₃P (7)

[in which R'' has the same meaning as described in connection with R'' of formula (1)]

(8)

Z(R''O)₂P (8)

[in which R'' and Z each have the same meaning as described in connection with R'' of formula (1) and Z of formula (2), respectively]

(9)

Z₂(R'''O)P (9)

[in which R''' and Z each have the same meaning as described in connection with R''' of formula (3) and Z of formula (2), the plural Z's optionally being the same or different]

(10)

(R''O)₂POP(OR'')₂

(10)

[in which R'' has the same meaning as described in connection with R'' of formula (1)]
(11) a halogen-containing phosphorus compound selected from the group consisting of phosphorus oxyhalides and phosphorus halides, or a combination of one of the above halogen containing phosphorus compounds with water, and
(12) a combination of a phosphorus compound selected from the group consisting of phosphorus oxide and compounds containing a phosphorus-halogen linkage, preferably a phosphorus oxyhalide of the formula POX₃ (in which X represents a halogen atom), with a compound selected from the group consisting of aliphatic alcohols of 1–12 carbon atoms, preferably 2–4, carbon atoms, aliphatic polyhydric alcohols of 1–12 carbon atoms, preferably 2–4, carbon atoms, epoxides derived from olefins or halogenated olefins of 2–12 carbon atoms, preferably 3–6 carbon atoms, and dialkyl ethers of 4–8 carbon atoms, preferably 4–6 carbon atoms, provided that when a dialkylether is used, a phosphorus oxide is used as the phosphorus compound, which are the components forming the esters of oxyacids of phosphorus or P—O—C linkage as the reaction products, with the further proviso that if one metallic compound is used as the reactant (I), a halide or alkoxy halide is used, and if plural metallic compounds are used, at least one of which should contain halogen; and, if the halogen-containing phosphorus compound of (11) of (II) or a combination of one of these with water is used, an alkoxide selected from the group consisting of alkoxides of n=3 referring to formula (i) and those of n=4 referring to formula (ii) from reactant (I) is used.

Incidentally, when an alkoxy compound is selected from the aluminum compounds of formula (i) as reactant (I), preferably a completely esterified product is selected as the phosphorus-containing compound in reactant (II), rather than a partially esterified product.

Heretofore, various catalysts have been proposed for homo- or co-polymerization of vicinal alkylene oxides. For example, catalyst systems composed chiefly of organic compounds of Group II or III metals of the periodic table, such as organoaluminum compounds, organozinc compounds, organomagnesium compounds, etc. have been proposed, some of are being commercialized. This type of catalyst has certain technical drawbacks in that generally the required catalytic amount per unit amount of monomer is large, and the catalysts are dangerous or disadvantageous in handling, because they are combustible and quickly lose their catalytic activity in air. Furthermore, the catalysts composed chiefly of organozinc compounds are valuable for the polymerization of olefin oxides of relatively simple structures, such as ethylene oxide, propylene oxide, etc., but they fail to show any practical degree of catalytic activity for polymerization of halogen-substituted oxides such as epihalohydrins. Thus their utility is severely limited in the applicable type of vicinal alkylene oxides.

There was also a proposal to utilize the reaction products of aluminum alkoxides with phosphoric or phosphonic acids, presumably aluminum phosphate, as the catalyst for polymerization of vicinal alkylene oxides (U.S. Pat. No. 3,244,646). In comparison with such inorganic salt-type catalysts as above, the catalysts obtained through the combinations specified in this invention show far higher activities with respect to rate and degree of polymerization.

Use of polyphosphates of Group IV metals such as Ti and Zr as the catalyst was proposed as an example of utilization of Group IV metals of the periodic table [C.A. 63 10071 g-100726 (1965)]. However, the catalysts are again under heavy limitations as to the applicable type of vicinal alkylene oxides, i.e., they show only low polymerization activity for ethylene oxide alone.

As other proposals for utilizing Group IV metals, use of a tin halide-diamine complex (East German Pat. No. 55431/67), a stannous salt of carboxilic acid (U.S. Pat. No. 2,933,459) and the reaction product of stannous chloride with alkylene oxide (U.S. Pat. No. 3,248,347) are known. However, those catalysts provide polymers of relatively low molecular weights only, are limited in the applicable type of alkylene oxides, and must be used in large quantities to obtain any appreciable results.

It is known that so-called Friedel-Crafts catalyst, such as halides of Al, Sn, and Zr, are useful for the polymerization of various alkylene oxides, but they are also well known for their inability to provide high molecular weight polymers.

Research has now been conducted with the view to overcome the disadvantages and drawbacks inherent in the above described conventional catalysts, and it has now been discovered that the reaction products of the metallic compound or compounds selected from the compounds of previously given formulae (i) through (iii) as reactant (I) with the phosphorus-containing compound or compounds selected from the twelve groups as the reactant (II), the combination of the reactants duly meeting the given limitations on their selection, show high catalytic activity for wide varieties of vicinal alkylene oxides. They also exhibit high stability and therefore are easy to handle during their preparation, storage, and use in the polymerization systems. The catalysts can be used in similar catalytic amounts compared with the amounts of conventional catalysts, and they give equally satisfactory results at relatively low polymerization temperatures, forming vicinal alkylene oxide polymers of optional molecular weights and crystallinity ranging from the amorphous state to crystalline state. Thus, the disadvantages and drawbacks in the conventional processes are effectively overcome by the catalysts of this invention.

Accordingly, therefore, the object of the present invention is to provide a polymerization or copolymerization process of vicinal alkylene oxides which achieves the numbers of improvements as described above.

Another object of the invention is to provide catalysts for polymerizing vicinal alkylene oxides, which are useful in the above polymerization or copolymerization process.

Still many other objects and advantages of the invention will become apparent from the following description.

The catalyst of the invention is any of the reaction products obtained by reacting at least one of the metallic compounds of formula (i) through (iii) as reactant (I), with at least one of the phosphorus-containing compounds of group (1) through (12) as reactant (II). The reaction product may be used as prepared, or purified before use. In most ordinary cases, reaction products of one or two metallic compounds of (I) and a phosphorus-containing compound of (II) are used.

When one metallic compound is selected from (I), a halide or alkoxy halide is chosen from the compounds of formulae (i) through (iii), and if plural metallic compounds are used, a combination of the compounds of different metals should be chosen. In the latter case, at least one of the metallic compounds should contain halogen. Again, if a halogen-containing phosphorus compound is used as reactant (II), at least one alkoxide selected from the alkoxides of $n = 3$ of formula (i), and those of $n = 4$ of formula (ii), is used as reactant (I).

As already mentioned, when a halogenated alkoxy compound represented by formula (i), i.e., those in which R is an alkoxy radical and $n$ equals 1 or 2 of such formula, is selected as reactant (I), as the phosphorus-containing compound of (II) a completely esterified product is preferred, rather than a partially esterified product.

The combination of the catalyst-forming reactants is optional, so far as the foregoing limitations are satisfied. Whereas, as preferred examples, the following combinations may be named:

As the reactant (I), aluminum trihalide of formula (i) in which $n$ equals zero is used with, as reactant (II), a compound of group (1) in which R'' is an organic radical selected from the group consisting of alkyl of 1–12, preferably 2–8 carbon atoms and halogenated alkyl of 1–12, preferably 2–4 carbon atoms.

As reactant (I), a tetrahalide of a Group IV metal of formula (ii) in which M is selected from the group consisting of Ti, Zr, Hf and Sn, and $m$ equals zero, is used with, as reactant (II), a compound of group (1) in which R'' is an organic radical selected from the group consisting of alkyl of 1–12 preferably 2–8 carbon atoms and halogenated alkyl of 1–12, preferably 2–4 carbon atoms.

As reactant (I), a tin dihalide of formula (iii) in which X is chlorine or bromine is used with, as reactant (II), a compound of group (1) in which R'' is an organic radical selected from the group consisting of alkyl of 1–12, preferably 2–8 carbon atoms and halogenated alkyl of 1–12, preferably 2–4 carbon atoms.

As reactant (I), a combination of compounds of the same metal selected from aluminum trialkoxides of formula (i) in which R is an alkoxy radical of 1–8 carbon atoms and $n$ equals 3 and an aluminum trihalide of formula (i) in which X is a halogen atom and $n$ equals 0, is used with, as reactant (II), a compound of group (1) in which R'' is an organic radical selected from the group consisting of alkyl of 1–12, preferably 2–8 carbon atoms and halogenated alkyl of 1–12, preferably 2–4 carbon atoms.

As reactant (I), a combination of compounds of different metals selected from aluminum trialkoxides of formula (i) in which R is an alkoxy radical of 1–8 carbon atoms and $n$ equals 3, and silicon halide, or alkyl or phenyl silicon halide, or alkoxy silicon halide, of formula (ii) in which M is Si and $m$ is 0–2, is used with, as reactant (II), a compound of group (1) in which R'' is an organic radical selected from the group consisting of alkyl of 1–12, preferably 2–8 carbon atoms and halogenated alkyl of 1–12, preferably 2–4 carbon atoms.

As the reactant (I), a combination of compounds of different metals selected from aluminum trialkoxides of formula (i) in which R is an alkoxy radical of 1–8 carbons and $n$ equals 3, and germanium halide, or alkyl or phenyl germanium halide, or alkoxy germanium halide, of formula (ii) in which M is Ge and $n=0$–2, is used with, as reactant (II), a compound of group (1) in which R'' is an organic radical selected from the group consisting of alkyl of 1–12, preferably 2–8 carbon atoms and halogenated alkyl of 1–12, preferably 2–4 carbon atoms.

As reactant (I), a combination of compounds of different metals selected from silicon halide, alkyl or phenyl silicon halide, or alkoxy silicon halide of formula (ii) in which M is Si and $m$ is 0–2, and tin halide or alkyl- or phenyl-tin halide of formula (ii) in which M is Sn and $m$ is 0–3, is used, with reactant (II) of formula (1) in which R'' is an organic radical selected from alkyl of 2–8 carbon atoms and halogenated alkyl of 2–4 carbon atoms.

In the above preferred examples, the compounds of formula (1) as reactant (II) can be replaced by the combination of group (12), preferably by the combination of phosphorus oxyhalide of the formula $POX_3$ (in which X stands for a halogen atom) with the P—O—C linkage-forming component of an aliphatic alcohol of 1–12, preferably 2–4, carbon atoms.

Furthermore, when a reaction product of plural compounds of different metals as reactant (I) with the reactant (II) is used as the catalyst in accordance with the invention, addition of an organometal compound selected from the following groups (a) through (c) as promotor is useful to further increase the catalytic activity:

organoaluminum compound of the formula,

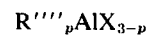

(a)

[in which R'''' is a member of the group consisting of alkyl of 1-8, preferably 1-4 carbon atoms, and phenyl, X stands for halogen, preferably a member of the group consisting of Cl, Br and I, and $p$ is an integer of 1-3];

organozinc compound of the formula, $$Q_2Zn \quad \text{(b)}$$

[in which Q is an alkyl of 1-4 carbons, or phenyl]; and organomagnesium compound of the formula, $$Q_2Mg \quad \text{(c)}$$

[in which Q has the same meaning as above].

The preferred quantitative range of the promotor is 0.01-100 percent, particularly 0.1-50 percent, by weight, based on the reaction product serving as the main catalyst. If the catalyst and promotor are mixed or contacted in advance, in certain cases the catalytic activity may be lowered. Therefore, it is preferred to add the two simultaneously or at different times to the polymerization zone, in the presence of vicinal alkylene oxide to be polymerized. For example, either the catalyst or promotor is charged in the polymerization area and later the other is added, either at the beginning of, or during, the polymerization.

In the above, some of the preferred examples of combinations of catalyst-forming reactants are given, with the understanding that other combinations may of course be employed.

The precise compositions or structures of the reaction products of the reactants (I) and (II) are not yet clear. They are normally obtained as white to light yellow solids. For example, if zirconium tetrachloride as reactant (I) and tri-n-butyl phosphate as reactant (II) are reacted at a molar ratio of 1:2, n-butyl chloride is distilled off from the system, and the remaining solid product shows high activity for polymerization of various vicinal alkylene oxides.

In an example of elementary analysis of the solid reaction product, the carbon content was 28.4 wt percent, and hydrogen content was 5-6 wt. percent. The details of its structure are not clear, but from these analytical values alone it is inferred that first a phosphoric acid ester salt of halogenated zirconium of the formula:

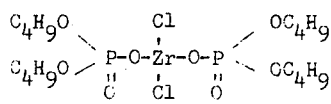

(calculated value of carbon content: 34.9 percent) is formed, and then it is condensed into a structure somewhat similar to the following structure.

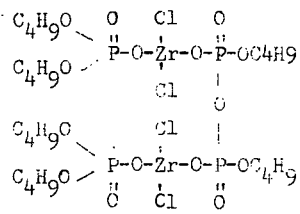

(calculated value of carbon content: 27.9 percent) avoid

Of course, the present invention is by no means limited by the above inferred structure. If the reaction is further continued until the carbon and hydrogen contents approach zero, a tendency appears that the catalytic activity of the reaction product is remarkably reduced. Therefore, it is necessary to aviod such excessive reaction, but suspend it at a suitable time which can be easily empirically determined. If the organic phosphoric ester is replaced by inorganic phosphoric acid or metal phosphate, the reaction product fails to show any useful degree of catalytic activity. Thus it is presumed that the presence of a structure which is derived from the chemical reaction of the ester of oxyacid of phosphorous with the reactant (I) has some important significance to the effect of the present invention, it being understood that such a conjecture in no way limits the scope of this invention.

The catalysts in accordance with the invention exhibit satisfactory stability, although in certain cases their catalytic activity may be somewhat lowered by prolonged contact with moisture. Particularly when stored as solutions in hydrocarbons, particularly in aromatic hydrocarbons such as benzene, toluene, and xylene, they exhibit excellent storage stability. They are completely inert to dry air, and entirely free from handling hazards.

While the reaction of reactants (I) and (II) advances at room temperature in some cases, it is preferably performed at elevated temperatures, e.g., room temperature — 400°C., preferably 50°-400°C., more preferably around 100°-300°C.

When plural compounds of different metals are used as reactant (I), the metallic compounds and the reactant (II) may be simultaneously charged into the reaction zone, or optionally two of the compounds may be charged first and the other, added later. According to a preferred practice, the metallic compounds are mixed in advance, and then reactant (II) is added to be reacted.

The reaction is normally performed in the absence of solvent, but if desired, inert hydrocarbons such as heptane, benzene, halogenated hydrocarbons such as carbon tetrachloride, may be used as the solvent. It is also permissible to use a solvent which dissolves the metal halide, such as an ether. The reaction may be performed in the air, but reaction in an inert gaseous atmosphere, such as of nitrogen, argon, carbon dioxide, etc. is preferred, particularly when an easily oxidized component is employed.

As the reaction progresses, side-products differing for each specific combination of reactants (I) and (II), such as alkyl halide, aryl halide, alkenes, alcohol, etc. are formed, which are conveniently distilled off from the system under the heated reaction conditions. When the catalysts are to be prepared in large quantities, the reaction is preferably performed under agitation.

The molar ratio of the reactants is variable over a wide range and subject to no specific limitations. A mole ratio of approximately 0.01-50 mols of reactant (II) per mol of reactant (I) (if plural compounds are, per mol of the total of used metallic compounds used) is generally employed. Preferably the mole ratio of reactant (II) may range approximately from 0.1-15 mols, inter alia, 0.1–10 mols, per mol of reactant (I). Also when plural compounds are used as reactant (I), the mol ratio among them is freely variable. For example, when two metallic compounds are used, the molar ratio ranging approximately from 1:10 to 10:1 may often be used.

The reaction products of reactants (I) and (II) are useful as the polymerization catalysts of vicinal alkylene oxides as they are, but if desired, may be purified to remove the volatile components such as unreacted components and side-products, under reduced pressure and/or heating. They may also be purified by washing with a suitable washing solvent such as hexane, heptane, and ether, or dissolving in a suitable solvent such as benzene, toluene, and xylene, to be reprecipitated therefrom. In certain cases they may be dissolved in a suitable solvent, e.g., benzene, and allowed to stand for a predetermined time under heating or at room temperature, to be imparted with increased or stabilized catalytic activity.

The reaction product can be added to the polymerization system as solid or solution. If used as solid, it is preferably ground before use.

Specific examples of the aluminum compounds of formula (i) among the reactant (I) include, for example, aluminum halides of the formula (i) in which $n$ equals zero, such as $AlCl_3$, $AlBr_3$, and $AlI_3$. monoalkyl-, monoaryl- or monoalkoxy-aluminum halides with $n$ equalling 1, such as $CH_3AlCl_2$, $C_2H_5AlBr_2$ $C_2H_5AlCl_2$, isoC$_4$H$_9$AlCl$_2$, $C_6H_5AlI_2$, $C_2H_5OAlCl_2$, $C_3H_7OAlBr_2$, isoC$_3$H$_7$OAlCl$_2$, isoC$_5$H$_{11}$OAlI$_2$, nC$_4$H$_9$OAlCl$_2$, and isoC$_4$H$_9$OAlBr$_2$; dialkyl-, diaryl-, or dialkoxy-aluminum monohalides with $n$ equalling 2, such as $(C_2H_5)_2AlCl$, $(nC_3H_7)_2AlI$, $(isoC_4H_9)_2AlBr$, $(C_6H_5)_2AlCl$, $(C_2H_5O)_2AlCl$, $(isoC_3H_7O)_2AlBr$, $(n\ C_4H_9O)_2AlI$, and $(C_6H_5CH_2)_2AlBr$); and trialkyl-, triaryl, or trialkoxy-aluminum with $n$ equalling 3, such as $(CH_3)_3Al$, $(C_2H_5)_3Al$, $(nC_3H_7)_3Al$, $(isoC_4H_9)_3Al$, $(C_6H_5)_3Al$, $(CH_3O)_3Al$, $(C_2H_5O)_3Al$, $(isoC_3H_7O)_3Al$, $(nC_3H_7O)_3Al$, $(nC_4H_9O)_3Al$, $(isoC_4H_9O)_3Al$, $(t-C_4H_9O)_3Al$, $(nC_5H_{11}O)_3Al$, $(isoC_5H_{11}O)_3Al$, $(nC_6H_{13}O)_3Al$, $(nC_8H_{17}O)_3Al$ and $(C_6H_5CH_2O)_3Al$.

Specific examples of Group IV metallic compounds of formula (ii) of reactant (I) include, when M is silicon, silicon halides with $m$ equalling zero, such as $SiF_4$, $SiCl_4$, $SiBr_4$, and $SiI_4$; alkyl-, aryl-, or alkoxy-silicon trihalides with $m$ equalling 1, such as $CH_3SiCl_3$, $CH_3SiBr_3$, $C_2H_5SiI_3$, $C_6H_5SiBr_3$, and $C_2H_5OSiCl_3$; dialkyl-, diaryl-, or dialkoxy-silicon dihalides with $m$ equalling 2, such as $(CH_3)_2SiCl_2$, $(C_6H_5)_2SiBr_2$, $(CH_2=CH)_2SiCl_2$, $(C_2H_5O)_2SiCl_2$, and $(C_3H_7O)_2SiI_2$; trialkyl-, triaryl-, or trialkoxy-silicon halides with $m$ equalling 3, such as $(CH_3)_3SiCl$, $(C_2H_5)_{31}SiBr$, $(C_6H_5)_3SiI$, $(C_2H_5O)_3SiCl$, and $(C_3H_7O)_3SiBr$; tetralkyl-, tetraaryl-, tetraalkoxy-, or alkylalkoxy-silicons with $m$ equalling 4, such as $(CH_3)_4Si$, $(C_4H_9)_4Si$, $(CH_3)_3SiCH_2CH=CH_2$, $(C_6H_5)_4Si$, $(C_2H_5O)_4Si$, $(C_3H_7O)Si$, $(CH_3)_2Si(OCH_3)_2$, $C_6H_5Si(OC_2H_5)_3$, and $(C_2H_5)_3SiOC_2H_5$: when M is germanium, germanium halides of $m=0$, such as $GeF_4$, $GeCl_4$, $GeBr_{p137pGe(och_4}$, and $GeI_4$; monoalkyl- or monoalkoxy-germanium trihalides of $m=1$ such as $Ge(C_2H_5)Cl_3$, $Ge(CH_3)Br_3$, and $Ge(OCH_3)Cl_3$; dialkyl- or dialkoxy germanium dihalides of $m=2$ such as $(CH_3)_2GeCl_2$, $(C_6H_5)_2GeBr_2$, $(CH_3O)_2GeCl_2$, and $(C_2H_5O)_2GeI_2$; trialkyl germanium halides such as $(CH_3)_3GeCl$ and $(C_2H_5)_3GeCl$: when M is tin, tin halides of $m=0$ such as $SnF_4$, $SnCl_4$, $SnBr_4$, and $SnI_4$; monoalkyl-, monoaryl-, monoalkenyl-, or monoaralkyl-tin trihalides of $m=1$ such as $CH_3SnBr_3$, $C_2H_5SnCl_3$, $C_3H_7SnI_3$, $C_4H_9SnCl_3$, $C_5H_{11}SnBr_3$, $C_8H_{17}SnI_3$, $C_6H_5SnBr_3$, $C_6H_5CH_3SnCl_3$, and $CH_2=CHSnCl_3$; dialkyl-, diaryl-, dialkenyl-, or diaralkyl-tin dihalides of $m=2$ such as $(CH_3)_2SnCl_2$, $(C_2H_5)_2SnBr_2$, $(C_3H_7)_2SnF_2$, $C_4H_9SnI_2$, $(C_8H_{17})_2SnCl_2$, $(C_6H_5)_2SnCl_2$, $(C_6H_5CH_2)_2SnBr_2$, and $(CH_2=CH-CH_2)_2SnBr_2$; trialkyl-, trialkenyl-, or triaralkyl-tin halides of $m=3$ such as $(CH_3)_3SnI$, $(C_2H_5)_3SnI$, $(C_3H_9)_3SnBr$, $(C_4H_9)_3SnCl$, $(C_8H_{17})_3SnF$, $(C_6H_5)_3SnI$, $(C_6H_5CH_2)_3SnCl$, and $(CH_2=CH)_3SnBr$; tetraalkyl-, tetraaryl-, tetraalkenyl-, or tetraaralkyl-tin or alkylalkoxy tin of $m=4$, such as $(C_2H_5)_4Sn$, $(C_6H_5)_4Sn$, $(CH_2=CH)_4Sn$, $(C_6H_5CH_2)_4Sn$, $(C_3H_7)_2Sn(OCH_3)_3$, $(C_4H_9)_2Sn(OC_{12}H_{23})_2$, and $(C_8H_{17})_3Sn(OC_4H_9)$: when M is titanium, titanium halides of $m=0$ such as $TiCl_4$, $TiBr_4$, $TiI_4$, etc.; monoalkoxy titanium trihalides of $m=1$ such as $(Ti(OCH_3)Cl_3$, $Ti(OC_2H_5)Br_3$, $Ti(OC_3H_7)Cl_3$, $Ti(OC_4H_9)I_3$, and $Ti(OC_8H_{17})Cl_3$); dialkoxy titanium dihalides of $m=2$ such as $Ti(OC_2H_5)_2Cl_2$, $Ti(OC_3H_7)_2Br_2$, $Ti(OC_6H_{13})_2Cl_2$, and $Ti(OC_7H_{15})I_2$; trialkoxy titanium halides of $m=3$, such as $(Ti(OCH_3)_3Cl$, $Ti(OC_2H_5)_3Br$, $Ti(OC_3H_7)_2(OC_2H_5)Cl$, and $Ti(OC_4H_9)_3I$; tetraalkoxy titanium of $m=4$ such as $Ti(OCH_3)_4$, $Ti(OC_2H_5)_4$, $Ti(OC_3H_9)_4$, and $Ti(OC_8H_{17})_4$; when M is zirconium, zirconium halides of $m=0$ such as $ZrF_4$, $ZrCl_4$, $ZrBr_4$, and $ZrI_4$; monoalkoxy-zirconium trihalides of $m=1$ such as $Zr(OC_2H_5)Cl_3$, $Zr(OC_2H_5)Br_3$, $Zr(OC_3H_9)Cl_3$, $Zr(OC_4H_9)Br_3$ and $Zr(OC_6H_{13})Cl_3$; dialkoxy-zirconium dihalides of $m=2$ such as $Zr(OC_2H_5)_2Cl_2$, $Zr(OC_3H_9)_2Cl_2$ and $Zr(OC_5H_{11})Br_2$; trialkoxy-zirconium halides of $m=3$ such as $Zr(OC_2H_5)_3Br$, $Zr(OC_3H_7)_3Cl$, and $Zr(OC_4H_9)_3Cl$; and tetraalkoxy-zirconium of $m=4$ such as $Zr(OCH_3)_4$, $Zr(OC_2H_5)_4$, $Zr(OC_3H_9)_4$, $Zr(OC_4H_9)_4$, and $Zr(OC_5H_{11})_4$: and when M is hafnium, hafnium halides of $m=0$ such as $HfF_4$, $HfCl_4$, $HfBr_4$, and $HfI_4$; monoalkoxy-hafnium halides of $m=1$ such as $Hf(OC_2H_5)Cl_3$, and $Hf(OC_4H_9)Br_3$); dialkoxy-hafnium dihalides of $m=2$ such as $(Hf(OC_2H_5)_2Cl_2$, $Hf(OC_3H_7)_2Br_2$, and $Hf(OC_5H_{11})3\ I_2$; trialkoxy-hafnium halides of $m=$such as $Hf(OC_3H_9)_3I$, and $Hf(OC_4H_9)_3Cl$; and tetraalkoxy-hafnium of $m=4$ such as $Hf(OC_2H_5)_4$, $Hf(OC_3H_9)_4$, $Hf(OC_4H_9)_4$, and $Hf(OC_5H_{11})_4$.

Preferred specific examples of the metallic compounds of the formula (iii) of reactant (I) include $SnCl_2$ and $SnBr_2$.

Also the specific examples of group (1) of reactant (II) include $(CH_3)_3PO_4$, $(C_2H_5)_3PO_4$, $(C_3H_7)_3PO_4$, $(C_4H_9)_3PO_4$, $(C_5H_{11})_3PO_4$, $(C_8H_{17})_3PO_4$, $(ClC_2H_4)_3PO_4$, $(Cl_2C_3H_5)_3PO_4$, $(cycloC_6H_{11})_3PO_4$, $(CH_2=CH-CH_2)_3PO_4$, $(BrC_2H_4)_3PO_4$, $(ClBrC_3H_5)_3PO_4$, $(C_2H_5)_2HPO_4$, $(C_3H_7)_2HPO_4$, $(C_4H_9)_2HPO_4$, $(C_8H_{17})_2HPO_4$, $(ClC_2H_4)_2PO_4$, $(CH_2=CH\ CH_2)_2PO_4$, $(Br_2C_3H_5)_2HPO_4$, $(2-C_2H_5-cycloC_6H_{11})H_2PO_4$, $(C_3H_9)H_2PO_4$, and $(C_4H_9)H_2PO_4$.

Examples of group (2) compounds of the reactant (II) are as follows : $C_6H_5(C_2H_5O)_2PO$, $C_6H_5(C_4H_9O)_2PO$, $C_6H_5(C_8H_{17}O)_2PO$, $C_4H_9(C_4H_9O)_2PO$, $C_2H_5(C_3H_7O)_2PO$, $CH_3(C_5H_{11}O)_2PO$, $C_3H_7(C_2H_7O)_2PO$, $C_4H_9(C_2H_5O)_2PO$, $C_6H_5(C_2H_5O)HOPO$, $C_6H_5(C_3H_7O)HOPO$, $C_4H_9(C_4H_9O)HOPO$, and $C_3H_3(C_2H_5O)HOPO$.

Examples of group (3) compounds include: $(C_6H_5)_2(C_2H_5O)PO$, $(C_6H_5)_2(C_4H_9O)PO$, $(C_6H_5)_2(C_8H_{17}O)PO$, and $(C_2H_5)_2(C_2H_5O)PO$.

Examples of group (4) compounds include:

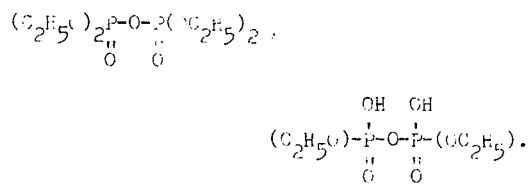

An example of group (5) compounds is:

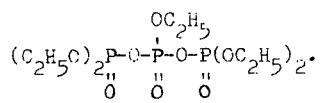

Examples of group (6) compounds include:

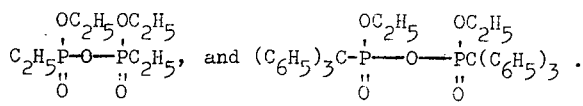

Examples of group (7) compounds include: $(CH_3O)_3P$, $(C_2H_5O)_3P$, $(C_3H_7O)_3P$, $(C_4H_9O)_3P$, $(C_5H_{11}O)_3P$, $(C_8H_{17}O)_3P$, $(C_{12}H_{23}O)_3P$, $(CH_2=CHCH_2O)_3P$, $(ClC_2H_4O)P$, $(C_2H_5O)_2HOP$, $(C_3H_7O)_2HOP$, $(C_4H_9O)_2HOP$, $(CH_2=CHCH_2O)_2HOP$, $(C_3H_7O)(HO)_2P$, $(C_4H_9O)(HO)_2P$, $23O)(HO)_2P$.

Examples of group (8) compounds include: $C_4H_9P(OC_2H_5)_2$, $CH_3P(OC_2H_5)_2$, and $C_6H_5P(OC_2H_5)_2$.

Examples of group (9) compounds include: $(C_6H_5)_2P(OCH_3)$, $(C_6H_5)_2P(OC_2H_5)$, $C_2H_5(C_6H_5)P(OC_2H_5)$, $(C_2H_5)_2P(OC_2H_5)$, $CH_3(C_2H_5)P(OC_2H_5)$, and $(C_4H_9)_2P(OC_2H_5)$.

Specific examples of group (10) compounds include: $(C_2H_5O)_2POP(OC_2H_5)_2$, $(C_3H_7O)_2POP(OC_3H_7)_2$, and $(C_4H_9O)_2POP(OC_4H_9)_2$.

Specific examples of the halogen-containing phosphorus compounds of group (11) which are to be reacted with a metal alkoxide selected from the alkoxides of formula (i) of reactant (I) in which $n = 3$ and the alkoxides of formula (ii) in which $n = 4$, include, besides a phosphorus oxyhalide, a phosphorus trihalide represented by the formula $PX_3$ (in which X stands for a halogen atom) and phosphorus pentahalide of the formula $PX_5$ (in which X stands for a halogen atom). Particularly a phosphorus trihalide, inter alia, phosphorus trichloride, is preferred.

As reactant (II), the phosphorus compound to be used in the combination of P—O—C linkage-forming component of group (12), for example, inorganic phosphorus compounds such as phosphorus trioxide, phosphorous tetroxide, phosphorous pentachloride, phosphorus halides represented by the foregoing formula $PX_3$ or $OX_5$, and phosphorus oxyhalides represented by the formula $POX_3$ (in which X stands for a halogen atom); as well as the compounds represented by the formulae, $XD_2PO$, $X_2DPO$, $XD_2P$, and $X_2DP$, in which X stands for a halogen atom and D stands for a member of the group consisting of alkyl of 1–8 carbon atoms, phenyl and alkoxy of 2–8 carbon atoms, may be named. More specific examples are as follows: $(C_2H_5O)_2ClPO$, $(C_8H_{17}O)_2BrPO$, $(C_4H_9)_2IPO$, $(C_6H_5)_2BrPO$, $(C_3H_7O)Cl_2PO$, $(C_4H_9O)Br_2PO$, $C_6H_5Cl_2PO$, $(C_2H_5O)_2PCl$, $(C_8H_{17}O)_2PBr$, $(C_4H_9)_2PI$, $(C_6H_5)_2PBr$, $(C_5H_{11}O)PBr_2$, $(C_3H_7O)PCl_2$, $C_6H_{13}PI_2$, $C_6H_5PCl_2$.

As the compounds to be combined with the foregoing phosphorus compounds to form the reaction products of group (12), aliphatic alcohols such as $CH_3OH$, $C_2H_5OH$, $C_3H_7OH$, $C_4H_9OH$, $C_5H_{11}OH$, $C_6H_{13}OH$, cyclo$C_6H_{11}OH$, $C_8H_{17}OH$, $C_3H_5OH$, $C_6H_{13}OH$, cyclo$C_6H_{11}OH$, $C_8H_{17}OH$, $C_3H_5OH$, $$\begin{array}{c} CH_2-CH\cdot CH_2OH, \text{ and } CH_2-OH \\ | \quad | \qquad\qquad\qquad | \quad | \\ Cl \quad Cl \qquad\qquad\qquad Cl \quad OH \end{array}$$

aliphatic polyhydric alcohols such as $HOCH_2CH_2OH$, $$HOCH_2-CH-OH, \; \underset{\underset{CH_3}{|}}{CH_2}-\underset{\underset{OH}{|}}{CH}-\underset{\underset{OH}{|}}{CH_2}, \; \underset{\underset{OH}{|}}{CH_2}-\underset{\underset{OH}{|}}{CH}-\underset{\underset{OH_1}{|}}{CH_2}, \; \underset{\underset{Cl}{|}}{CH_2}-\underset{\underset{OH}{|}}{CH}-\underset{\underset{OH}{|}}{CH_2}, \; \underset{\underset{OH}{|}}{CH_2}-\underset{\underset{OH}{|}}{CH}-\underset{\underset{Cl}{|}}{CH_2},$$

$HOCH_2-CH_2-O-CH_2-CH_2-CH_2OH$, and $HOCH_2—CH—O—CH_2—CH_2—O—CH_2—CH_2OH$, and epoxides derived from olefins of 2–12 carbons such as

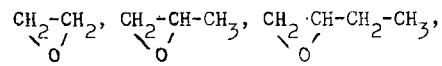

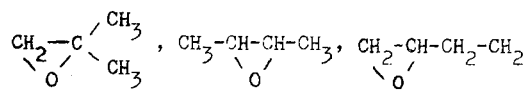

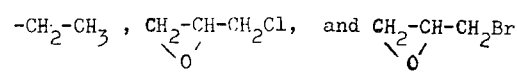

can be named. Also as the dialkylether to be combined with phosphorus oxide, diethyl ether, dipropyl ether, and dibutyl ether may be named.

As the promoter which may be concurrently used with the catalyst formed by the reaction of reactants (I) and (II), the following may be named: $(CH_3)_3Al$, $(C_2H_5)_3Al$, $(C_3H_7)_3Al$, $(C_4H_9)_3Al$, $(C_6H_5)_3Al$, $(CH_3)_2AlCl$, $(CH_3)_2AlBr$, $(C_2H_5)_2AlCl$, $(C_2H_5)_2AlBr$, $(C_2H_5)_2AlI$, $(C_6H_5)_2AlCl$, $(C_6H_5)_2AlBr$, $(C_6H_5)_2AlI$, $CH_3AlCl_2$, $CH_3AlI_2$, $C_2H_5AlCl_2$, $C_2H_5AlBr_2$, $C_3H_7AlBr$, $C_4H_9AlCl_2$, $C_4H_9AlBr_2$, $C_4H_9AlI_2$, $C_6H_5AlCl_2$, $C_6H_5AlBr_2$.

Specific examples of organozinc compounds of formula (b) are dialkyl zinc such as $(C_2H_5)_2Zn$, $(C_3H_7)_2Zn$, $(C_4H_9)_2Zn$, and $(C_6H_5)_2Zn$.

Specific examples of organomagnesium compounds of formula (c) are dialkyl magnesium such as $(CH_3)_2Mg$, $(C_2H_5)_2Mg$, $(C_3H_7)_2Mg$, $(C_4H_7)_2Mg$, and $(C_6H_5)_2Mg$.

The catalysts of the invention are useful for the preparation of homo- or co-polymers of vicinal alkylene oxides of optional molecular weight varying over a wide range and of varying crystallinity, i.e., from amorphous to crystalline state. This variation in molecular weight and crystallinity can be controlled by suitable selection of specific reactants (I) and (II). For example, in polymerization of epichlorohydrin, if the reaction product of a halide of Group IV metal of the periodic table, e.g., $SnCl_2$, with a ester of an oxyacid of phosphorous is used as the catalyst, a polymer of high crystallinity and high degree of polymerization is formed. However, if SnCl₂ is replaced by a halide of Ti, Zr, or Hf in the above catalyst, polymers of medium crystallinity with a high degree of polymerization are obtained. Again, if the SnCl₂ is replaced by a halide of Si, Ge, or Sn (tetravalent), the catalysts tend to give polymers of the degree of polymerization lower than the preceeding case. With the catalyst in which a halide of Al is used, amorphous polymers of a relatively low degree of polymerization tend to be formed. In contrast thereto, the reaction products of a mixture of aluminum halide or alkoxide with SiCl₄ or GeCl₄ with a ester of an oxyacid of phosphorous serve as the catalysts to give amorphous polymers of a high degree of polymerization.

Generally speaking, the selection of a specific compound or compounds of reactant (I) tends to influence the crystallinity and/or degree of polymerization of product polymers, while the selection of a specific phosphorus-containing compound as reactant (II) seemingly little affects the polymer properties. Again as a general tendency, the type of organic radicals in reactants (I) and (II) affects the smooth progress of the catalyst-forming reaction alone, and the type of organic radicals contained in the reaction product does not appreciably effect the crystallinity and/or degree of polymerization of the product polymers. However, as already mentioned the presence of the structure derived from the chemical reaction of an a ester of an oxyacid of phosphorus with one or more compounds of formula (I) possesses very significant bearing on the catalytic activity. Therefore, in accordance with the invention, the type of organic radicals in reactants (I) and (II) is variable over a considerably wide range.

The polymerization of vicinal alkylene oxides in accordance with the invention is performed using the herefore described novel catalyst. The polymerization temperature and quantity of the catalyst are not critical, although normally temperatures not lower than 0°C., and the catalytic quantity are employed. For example, temperature ranging 0° – 100°C., and 0.1 percent by weight to the vicinal alkylene oxide monomer (or monomeric mixture) are occasionally employed. If desired, it is of course permissible to use more than 2 wt. percent to the monomer of the catalyst, but such is unnecessary. Again reaction temperatures as low as approximately −20°C., or as high as 200°C. may be employed if desired, but such is unnecessary.

The polymerization progresses equally well, in the presence or absence of a solvent. As the solvent, any organic solvent which is inert to the catalyst and monomer can be used, with no other critical limitations. For example, aliphatic alkyl ethers such as diethyl ether, dipropyl ether, diisopropyl ether, etc.; aromatic hydrocarbons which may contain a substituent such as halogen, lower alkyl radical, etc., such as benzene, toluene, chlorobenzene, etc.; saturated aliphatic hydrocarbons such as propane, pentane, hexane, heptane and high alkanes; alicyclic hydrocarbons such as cyclohexane and methylcyclohexane; haloalkanes such as methyl chloride, methylene chloride, chloroform, carbon tetrachloride, and ethylene dichloride; and mixtures of foregoing, can be used.

In the subject process, the catalyst exhibits high stability as well as high activity, consequently notably facilitating the polymerization operations and maintaining good reproducibility of the reaction. Also only a minor quantity of the catalyst satisfactorily achieves the intended effect. Thus the possible detrimental effect of the residual catalyst in the polymer appearance, e.g., coloring, or on polymer properties, is eliminated.

Particularly amorphous high polymers of epihalohydrins which are useful as artificial rubber are normally formed through bulk or solution polymerization. However, if the polymerization is performed in the presence of subject catalyst and aliphatic hydrocarbons as the solvent, under stirring at a suitable rate, the rubbery product can be recovered as a granular precipitate. In such a process, incidental steps such as removal of solvent are markedly simplified.

The process of this invention can be practiced either continuously or batchwise.

The subject process is applicable to homo- or co-polymerization of wide varieties of vicinal alkylene oxides. As examples of such vicinal alkylene oxide monomers, the following may be named.

Vicinal alkylene oxides of formula (1) below:

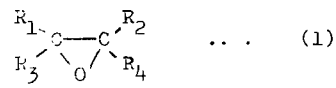
(1)

in which $R_1$, $R_2$, $R_3$, and $R_4$ are selected from the group consisting of (a) hydrogen; (b) saturated or unsaturated aliphatic hydrocarbon radicals containing 1–18 carbon atoms, $R_1$ through $R_4$ nor forming a ring; (c) aryl-substituted group (b) radicals; (d) group (b) radicals substituted with a cycloalkyl group of 5–7 carbon atoms; (e) halogen-substituted groups (b) (c), and (d) radicals; (f) aryl radicals which may be substituted with aliphatic radicals of 1–12 carbon atoms and/or halogen; (g) saturated or unsaturated cycloalkyl group of 5–7 carbon atoms, which may be substituted with aliphatic radicals of 1–12 carbon atoms and/or halogen; (h) groups (b) through (g) radicals containing an epoxy group; (i) radicals represented by the formula (2) below, $$-R'-O-R''$$
(2);

and (j) radicals represented by the formula (3) below,

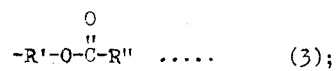
(3);

in the above formulae (2) and (3), R' is —CH₂—, and R'' is a member of the group consisting of:
(i) saturated or unsaturated aliphatic radicals of 1–18 carbon atoms;
(ii) the radicals of (i) above which are substituted with aryl;
(iii) the radicals of (i) above which are substituted with cycloalkyl of 5–7 carbon atoms;
(iv) aryl radicals optionally containing side chains of 1–12 carbon atoms;
(v) cycloalkyl radicals optionally containing side chains of 1–12 carbon atoms; and
(vi) radicals of (i) through (v) above, which are halogen-substituted.

As specific examples of such vicinal alkylene oxides, the following may be named; olefin oxides such as ethylene oxide, propylene oxide, 1-butene oxide, 2-butene oxide, isobutene oxide, 1-hexene oxide, 1-octene oxide, butadiene monoxide, cyclohexene oxide, and vinylcylcohexene monoxide; aromatic substituted olefin oxides such as styrene oxide, α-methylstyrene oxide, β-methylstyrene oxide, p-methylstyrene oxide, p-chlorostyrene oxide, o-chlorostyrene oxide, and glycidyl benzene; halogenated olefin oxides such as epichlorohydrin, epibromohydrin, epiiodohydrin, epifluorohydrin, 2-methylepichlorohydrin 3,3,3-trichloropropylene oxide, and 4,4,4-trichloro-1-butene oxide; glycidyl ethers such as methyl glycidyl ether, ethyl glycidyl ether, propyl glycidyl ether, butyl glycidyl ether, cyclohexyl glycidyl ether, phenyl glycidyl ether, tolyl glycidyl ether, p-chlorophenyl glycidyl ether, and allyl glycidyl ether; glycidyl esters of monocarboxylic acid such as glycidyl acetate, glycidyl propionate, glycidyl monochloroacetate, glycidyl benzoate, glycidyl acrylate, glycidyl methacrylate, and glycidyl cyclohexanecarboxylate; diepoxides of diolefins such as butadiene dioxide, vinylcyclohexene dioxide, and glycidyl silanes; glycidyl esters of dicarboxylic acids such as glycidyl phthalate, glycidyl maleate, and glycidyl succinate; and diglycidyl ethers which are the reaction product of bisphenols with epichlorohdrin.

Hereinafter several embodiments for practicing the subject process will be explained by means of working examples.

EXAMPLE 1

In the later given Table 1, examples of the catalyst preparation from various combinations of reactants (I) and (II) are shown. The manner of the catalyst preparation was as follows. A glass reactor of 500 ml in capacity which was equipped with a distillation column, stirrer, heating device and thermometer was charged with the reactants (I) and (II), and if necessary, a solvent. The system was heated under stirring, distilling off the volatile side-products of the reaction to semi-solidify or solidify the reaction system. The reaction product was subjected to either one of the following three post-treatments, and used as the polymerization catalyst for a vicinal alkylene oxide.

1. The reaction product was allowed to cool in air, pulverized, and dried at room temperature for 2 hours under reduced pressure.
2. The reaction product was allowed to cool in air, washed twice with hexane, and dried at 100°C. for 2 hours under reduced pressure.
3. The reaction product was allowed to cool in nitrogen gas, washed twice with hexane, and dissolved in benzene.

In the Table 1, the "reaction time" means the heating time at the highest reaction temperature. When necessary, the reaction and post-treatment were performed in nitrogen gas.

Table 1

| Catalyst No. | Reactant (I) Molecular formula | Amount used (g) | Reactant (II) Molecular formula | Amount used (g) | Solvent Type | Amount (ml) | Highest reaction temp. (°C.) | Reaction time (min.) | Post-treatment | Remarks |
|---|---|---|---|---|---|---|---|---|---|---|
| 1 | AlCl$_3$ | 26.6 | (nC$_4$H$_9$O)$_3$PO | 108.0 | ethyl ether | 50 | 135 | 15 | (1) | in N$_2$ gas |
| 2 | AlI$_3$ | 41.0 | (C$_2$H$_5$O)$_3$P | 26.5 | — | | 120 | 15 | (2) | do. |
| 3 | AlBr$_3$ | 26.7 | (nC$_8$H$_{17}$O)$_3$PO | 85.0 | — | | 140 | 10 | (2) | |
| 4 | C$_2$H$_5$AlCl$_2$ | 25.0 | (C$_2$H$_5$O)$_4$P$_2$O$_3$ | 58.0 | n-hexane | 30 | 220 | 15 | (2) | in N$_2$ gas |
| 5 | C$_6$H$_5$AlBr$_2$ | 35.8 | (iC$_3$H$_7$O)$_3$PO | 72.0 | n-hexane | 40 | 185 | 15 | (3) | do. |
| 6 | C$_2$H$_5$OAlCl$_2$ | 28.6 | (nC$_4$H$_9$O)$_2$PO(OH) | 21.0 | — | | 175 | 15 | (2) | |
| 7 | TiI$_4$ | 55.0 | (C$_2$H$_5$O)$_3$PO | 66.5 | — | | 205 | 10 | (2) | in N$_2$ gas |
| 8 | (iC$_3$H$_7$O)$_2$TiBr$_2$ | 62.0 | (C$_2$H$_5$)(nC$_3$H$_7$O)$_2$PO | 35.0 | — | | 140 | 10 | (2) | |
| 9 | ZrCl$_4$ | 23.3 | (nC$_4$H$_9$O)$_3$PO | 54.0 | — | | 180 | 10 | (2) | |
| 10 | ZrCl$_4$ | 23.3 | P$_2$O$_5$<br>nC$_4$H$_9$OH | 27.5<br>40.0 | — | | 170 | 10 | (2) | |
| 11 | ZrBr$_4$ | 23.3 | POCl$_3$<br>nC$_4$H$_9$OH | 30.0<br>40.0 | — | | 170 | 10 | (1) | in N$_2$ gas |
| 12 | HfCl$_4$ | 33.0 | (nC$_4$H$_9$O)$_3$PO | 54.0 | — | | 160 | 10 | (2) | |
| 13 | (nC$_4$H$_9$O)$_2$ZrCl$_2$ | 31.0 | C$_6$H$_5$(C$_6$H$_{13}$O)$_2$PO | 47.0 | — | | 195 | 15 | (2) | |
| 14 | HfCl$_4$ | 33.0 | PBr$_3$<br>CH$_2$=CHCH$_2$OH | 22.0<br>80.0 | — | | 145 | 15 | (2) | in N$_2$ gas |
| 15 | SiCl$_4$ | 34.0 | (CH$_2$=CHCH$_2$O)$_3$PO | 105.0 | — | | 170 | 20 | (2) | |
| 16 | GeCl$_4$ | 42.5 | (ClCH$_2$—CH$_2$CH$_2$O)$_3$PO | 78.0 | — | | 190 | 20 | (2) | |
| 17 | SnCl$_4$ | 26.0 | (nC$_4$H$_9$O)$_3$PO | 55.0 | — | | 210 | 10 | (2) | in N$_2$ gas |
| 18 | SnBr$_4$ | 31.5 | (ClCH$_2$CH$_2$O)$_3$PO | 135.0 | — | | 205 | 10 | (1) | do. |
| 19 | SnCl$_2$ | 38.0 | (nC$_4$H$_9$O)$_3$PO | 60.0 | — | | 240 | 15 | (2) | |
| 20 | SnBr$_2$ | 25.0 | (nC$_4$H$_9$O)$_3$PO | 78.0 | — | | 250 | 15 | (2) | |
| 21 | SnCl$_2$ | 38.0 | POBr$_3$<br>iC$_3$H$_7$CH | 57.0<br>60.0 | — | | 240 | 15 | (2) | in N$_2$ gas |
| 22 | Al(OiC$_3$H$_7$)$_3$ | 42.0 | PCl$_3$ | 14.0 | n-hexane | 50 | 70 | 5 | (1) | |
| 23 | Ti(OnC$_4$H$_9$)$_4$ | 70.0 | POCl$_3$ | 31.0 | — | | 100 | 30 | (2) | |
| 24 | Zr(OnC$_4$H$_9$)$_4$ | 55.0 | PBr$_3$ | 22.0 | n-hexane | 50 | 150 | 10 | (2) | |
| 25 | Al(OnC$_4$H$_9$)$_3$<br>Si(OC$_2$H$_5$)$_4$ | 25.0<br>21.0 | POCl$_3$ | 31.0 | n-hexane | 50 | 175 | 15 | (2) | |
| 26 | Al(OiC$_3$H$_7$)$_3$<br>Ti(OiC$_3$H$_7$)$_4$ | 42.0<br>32.6 | POBr$_3$ | 15.3 | n-hexane | 40 | 140 | 15 | (2) | |
| 27 | Zr(OC$_2$H$_5$)$_4$<br>Hf(OC$_2$H$_5$)$_4$ | 13.5<br>44.0 | PCl$_3$ | 28.0 | — | | 160 | 10 | (2) | |
| 28 | AlCl$_3$<br>SiCl$_4$ | 26.6<br>17.0 | (nC$_4$H$_9$O)$_3$PO | 73.0 | ethyl ether | 40 | 135 | 10 | (2) | |
| 29 | SiCl$_4$ | 17.0 | (nC$_4$H$_9$O)$_3$PO | 54.0 | — | | 95 | 30 | (2) | in N$_2$ gas |
| 30 | AlCl$_3$<br>(nC$_4$H$_9$)$_3$SnCl | 13.3<br>32.5 | C$_6$H$_5$(C$_2$H$_5$O)$_2$PO | 128.0 | — | | 230 | 10 | (2) | |
| 31 | AlI$_3$<br>Ch$_3$SiCl$_3$ | 41.0<br>15.2 | (nC$_3$H$_7$O)$_3$PO | | n-hexane | 40 | 160 | 10 | (2) | in N$_2$ gas |
| 32 | Al(OC$_2$H$_5$)$_3$<br>GeCl$_4$ | | nC$_3$H$_7$O)$_3$PO | | n-hexane | 40 | 185 | 10 | (2) | |
| 33 | Al(OiC$_3$H$_7$)$_3$<br>SiCl$_4$ | 35.0<br>36.0 | (nC$_4$H$_9$O)$_3$PO | 46.0 | — | | 175 | 20 | (3) | in N$_2$ gas |

Table 1—Continued

| Cat-alyst No. | Reactant (I) Molecular formula | Amount used (g) | Reactant (II) Molecular formula | Amount used (g) | Solvent Type | Amount (ml) | Highest reaction temp. (°C.) | Reaction time (min.) | Post-treatment | Remarks |
|---|---|---|---|---|---|---|---|---|---|---|
| 34 | Al(Oi(C₃H₇)₃ | 35.0 | | | | | | | | |
| | ZrCl₄ | 48.7 | (nC₆H₁₃O)₃PO | 93.0 | n-heptane | 40 | 190 | 10 | (2) | |
| 35 | Al(OiC₃H₇)₃ | 20.4 | | | | | | | | |
| | (CH₃)₂SiCl₂ | 13.0 | (nC₄H₉O)₄P₂O₃ | 35.2 | — | | 210 | 10 | (2) | |
| 36 | Al(OnC₄H₉)₃ | 25.0 | | | | | | | | |
| | HfCl₄ | 66.0 | (iC₃H₇O)₂PO(OH) | 48.5 | ethyl ether | 40 | 145 | 20 | (2) | |
| 37 | Al(OnC₄H₉)₃ | 25.0 | | | carbon tetra- | | | | | |
| | TiI₄ | 12.0 | (CH₂=CHCH₂O)₃PO | 49.0 | chloride | 70 | 205 | 15 | (2) | |
| | SnI₄ | 24.5 | | | | | | | | |
| 38 | Al(OC₂H₅)Cl₂ | 24.0 | | | | | | | | |
| | (C₂H₅O)₂ZrCl₂ | 32.0 | (C₆H₅)₂(nC₄H₉O)PO | 30.0 | — | | 210 | 5 | (1) | |
| 39 | Al(C₂H₅)₃ | 22.8 | | | | | | | | |
| | SiCl₄ | 34.0 | (nC₄H₉O)₃PO | 54.0 | n-hexane | 20 | 190 | 10 | (3) | in N₂gas |
| 40 | Al(C₆H₅)₃ | 27.0 | | | | | | | | |
| | SnBr₄ | 58.0 | (nC₆H₁₃O)₃P | 105.0 | n-neptane | 50 | 180 | 10 | (2) | do. |
| 41 | Al(C₂H₅)₃ | 22.8 | | | | | | | | |
| | ZrCl₄ | 23.5 | (nC₃H₇O)₃PO | 54.0 | n-hexane | 20 | 145 | 10 | (2) | do. |
| 42 | Al(C₂H₅)₂Cl | 23.5 | | | | | | | | |
| | (CH₃)₂SiCl₂ | 13.0 | (nC₂H₅O)₃PO | 22.0 | n-hexane | 22 | 170 | 20 | (2) | do. |
| 43 | TiCl₄ | 9.5 | | | | | | | | |
| | ZrCl₄ | 12.5 | POCl₃ | 45.0 | — | | 160 | 10 | (2) | in N₂gas |
| | HfCl₄ | 13.0 | C₆H₁₃OH | 60.0 | — | | | | | |
| 44 | ZrCl₄ | 23.3 | | | | | | | | |
| | GeCl₄ | 21.5 | (nC₄H₉O)₃PO | 108.0 | — | | 155 | 10 | (2) | |
| 45 | SnBr₂ | 28.0 | | | | | | | | |
| | Zr(OC₂H₅)₂Br₂ | 27.5 | (nC₄H₉O)₃PO | 81.0 | — | | 245 | 10 | (2) | |
| 46 | (nC₄H₉)₃SnCl | 32.5 | | | | | | | | |
| | SiCl₄ | 9.0 | (nC₄H₉O)₃PO | 81.0 | — | | 230 | 10 | (2) | |
| 47 | (C₆H₅)₂SnBr₂ | 35.5 | | | | | | | | |
| | GeBr₄ | 21.0 | (CH₂=CH—CH₂O)₃PO | 85.0 | — | | 215 | 10 | (2) | |
| 48 | SnCl₂ | 19.0 | | | | | | | | |
| | (nC₄H₉)₂SiCl₂ | 21.3 | (iC₄H₉O)₃PO | 54.0 | — | | 255 | 10 | (2) | |
| 49 | ZrI₄ | 25.0 | PI₃ | 39.0 | | | | | | |
| | SiI₄ | 22.0 | nC₃H₇OH | 40.0 | — | | 155 | 10 | (2) | |
| 50 | HfCl₄ | 33.0 | | | | | | | | |
| | (C₆H₅)₂SiCl₂ | 50.0 | (nC₄H₉O)₃PO | 95.0 | — | | 180 | 15 | (2) | |
| 51 | AlBr₃ | 27.0 | P₂O₅ | 15.0 | — | | 130 | 10 | (2) | on in 2gas |
| | SiBr₄ | 15.0 | nC₄H₉OH | 50.0 | | | | | | |
| 52 | Al(OiC₃H₇)₃ | 21.0 | POCl₃ | 16.5 | | | | | | |
| | SiCl₄ | 15.0 | iC₃H₇OH | 24.0 | — | | 165 | 10 | (2) | in N₂gas |
| | SiCl₄ | 15.0 | iC₃H₇OH | 24.0 | — | | 165 | 10 | (2) | in N₂gas |
| 53 | Ti(OnC₄H₉)₄ | 35.2 | | | | | | | | |
| | CH₃SiCl₃ | 13.0 | (nC₄H₉O)₃PO | 26.6 | n-hexane | 30 | 180 | 10 | (2) | |
| 54 | Zr(OC₂H₅)₂Cl₂ | 32.0 | | | | | | | | |
| | (CH₃)₂SiCl₂ | 13.0 | (C₆H₅)₂C₂H₅OPO | 38.0 | — | | 210 | 10 | (2) | |

EXAMPLE 2

The results of performing epichlorohydrin polymerization using the catalysts prepared in Example 1 are given in Table 2. The polymerization procedure was as follows.

A glass, tubular polymerization vessel of 100 ml in capacity was charged with the catalyst, and the inside atmosphere of the vessel was nitrogen-substituted. Into the vessel epichlorohydrin which had been dehydrated to a water content of no more than 20 ppm, and if necessary, a solvent also dehydrated to a water content of no more than 20 ppm, were then added, and the vessel was sealed. Mixing the content by means of a shaker, the polymerization was effected at the indicated temperature. When an alkylated compound of Zn, Mg, or Al was added as the promotor, the organometallic compound diluted in n-heptane was poured into the vessel immediately after the charging of epichlorohydrin. The polymer obtained was dissolved once in hot benzene or hot monochlorobenzene containing 0.5 percent of Nocrac NS-6 (2,2'-methylene-bis-4-methyl-6-t-butyl phenol), and the solution was poured into a large excess of methanol. The precipitate formed was separated and dried under reduced pressure. In Table 2, the reduced viscosity is that measured at 80°C., in a monochlorobenzene solution with a concentration of 0.1 g/100 ml. Also the crystallinity was determined by X-ray diffraction.

Table 2

| Run No. | Catalyst No. | Catalyst Amount (g) | Monomer Amount (g) | Solvent Type | Solvent Amount (g) | Promotor Molecular formula | Promotor Amount (g) | Reaction temp. (°C) | Reaction time (hr.) | Yield (%) | Reduced viscosity | Remarks |
|---|---|---|---|---|---|---|---|---|---|---|---|---|
| 1 | 1 | 0.2 | 40 | — | | — | | 40 | 24 | 70 | 0.38 | amoaphous |
| 2 | 2 | 0.2 | 40 | — | | — | | 40 | 24 | 38 | 0.29 | do. |
| 3 | 4 | 0.2 | 15 | benzene | 20 | — | | 40 | 24 | 50 | 0.90 | do. |
| 4 | 5 | 0.15 | 40 | — | | — | | 40 | 24 | 72 | 0.75 | do. |
| 5 | 7 | 0.15 | 40 | — | | — | | 55 | 24 | 50 | 1.15 | semi-crystalline |
| 6 | 9 | 0.15 | 40 | — | | — | | 55 | 24 | 92 | 2.05 | do. |
| 7 | 9 | 0.1 | 20 | benzene | 20 | — | | 55 | 24 | 71 | 2.20 | do. |
| 8 | 10 | 0.1 | 15 | benzene | 20 | — | | 60 | 24 | 75 | 1.80 | do. |
| 9 | 11 | 0.1 | 40 | — | | — | | 60 | 24 | 94 | 1.95 | do. |

Table 2—Continued

| Run No. | Catalyst No. | Catalyst Amount (g) | Monomer Amount (g) | Solvent Type | Solvent Amount (g) | Promotor Molecular formula | Promotor Amount (g) | Reaction temp. (°C) | Reaction time (hr.) | Yield (%) | Reduced viscosity | Remarks |
|---|---|---|---|---|---|---|---|---|---|---|---|---|
| 10 | 12 | 0.08 | 40 | — | | — | | 55 | 24 | 77 | 1.90 | do. |
| 11 | 14 | 0.1 | 40 | — | | — | | 55 | 24 | 45 | 1.52 | do. |
| 12 | 15 | 0.2 | 40 | — | | — | | 45 | 48 | 23 | 0.14 | do. |
| 13 | 17 | 0.2 | 15 | hexane | 20 | — | | 30 | 24 | 66 | 0.70 | do. |
| 14 | 18 | 0.2 | 40 | — | | — | | 30 | 24 | 72 | 0.65 | do. |
| 15 | 19 | 0.15 | 40 | — | | — | | 40 | 24 | 90 | 1.42 | crystalline |
| 16 | 20 | 0.15 | 40 | — | | — | | 40 | 24 | 55 | 1.05 | crystalline |
| 17 | 21 | 0.2 | 15 | carbon tetrachloride | 20 | — | | 40 | 24 | 70 | 1.15 | do. |
| 18 | 22 | 0.2 | 40 | — | | 13 | | 40 | 24 | 65 | 0.88 | amorphous |
| 19 | 23 | 0.1 | 40 | — | | — | | 60 | 24 | 83 | 1.18 | semi-crystalline |
| 20 | 25 | 0.1 | 40 | — | | — | | 40 | 24 | 89 | 1.45 | amorphous |
| 21 | 26 | 0.2 | 40 | — | | — | | 30 | 24 | 75 | 0.96 | do. |
| 22 | 28 | 0.2 | 40 | — | | — | | 40 | 24 | 65 | 1.82 | do. |
| 23 | 29 | 0.2 | 40 | — | | — | | 40 | 24 | 62 | 1.40 | do. |
| 24 | 29 | 0.2 | 40 | — | | AlEt$_3$ | 0.02 | 40 | 24 | 89 | 1.75 | do. |
| 25 | 29 | 0.2 | 15 | n-hexane | 20 | ZnEt$_2$ | 0.01 | 40 | 24 | 75 | 1.60 | do. |
| 26 | 30 | 0.2 | 40 | — | | — | | 15 | 48 | 52 | 1.10 | semi-crystalline |
| 27 | 32 | 0.2 | 40 | — | | — | | 40 | 24 | 78 | 1.40 | amorphous |
| 28 | 33 | 0.08 | 40 | — | | — | | 50 | 24 | 82 | 1.58 | do. |
| 29 | 33 | 0.05 | 10 | benzene | 30 | — | | 60 | 24 | 78 | 1.53 | do. |
| 30 | 33 | 0.05 | 10 | benzene | 30 | AlEt$_3$ | 0.01 | 60 | 24 | 96 | 3.55 | do. |
| 31 | 33 | 0.05 | 10 | benzene | 30 | MgEt$_2$ | 0.01 | 60 | 24 | 88 | 2.20 | do. |
| 32 | 33 | 0.08 | 10 | benzene | 30 | Al(iC$_3$H$_7$)$_3$ | 0.02 | 30 | 48 | 93 | 2.80 | do. |
| 33 | 34 | 0.2 | 40 | — | | — | | 35 | 24 | 55 | 1.55 | amorphous |
| 34 | 34 | 0.2 | 40 | — | | AlEt$_3$ | 0.01 | 55 | 24 | 87 | 1.95 | do. |
| 35 | 35 | 0.2 | 10 | benzene | 30 | — | | 45 | 24 | 72 | 1.40 | do. |
| 36 | 36 | 0.1 | 40 | — | | — | | 55 | 24 | 92 | 1.58 | semi-crystalline |
| 37 | 37 | 0.2 | 15 | carbon tetrachloride | 20 | — | | 50 | 24 | 53 | 1.22 | do. |
| 38 | 39 | 0.2 | 40 | — | | — | | 40 | 24 | 80 | 1.55 | amorphous |
| 39 | 39 | 0.2 | 40 | — | | ZnEt$_2$ | 0.02 | 40 | 24 | 89 | 1.75 | do. |
| 40 | 41 | 0.2 | 40 | — | | — | | 55 | 24 | 95 | 2.10 | semi-crystalline |
| 41 | 42 | 0.2 | 40 | — | | — | | 40 | 24 | 70 | 1.28 | amorphous |
| 42 | 43 | 0.2 | 40 | — | | — | | 45 | 24 | 85 | 1.95 | semi crystalline |
| 43 | 45 | 0.2 | 40 | — | | — | | 25 | 24 | 65 | 1.35 | crystalline |
| 44 | 46 | 0.1 | 40 | — | | — | | 25 | 24 | 75 | 1.39 | do. |
| 45 | 46 | 0.1 | 20 | benzene | 20 | — | | 25 | 24 | 60 | 1.40 | do. |
| 46 | 46 | 0.1 | 20 | benzene | 20 | AlEt$_3$ | 0.01 | 25 | 24 | 88 | 1.85 | do. |
| 47 | 48 | 0.1 | 20 | benzene | 20 | AlEt$_3$ | 0.01 | 25 | 24 | 73 | 1.58 | do. |
| 48 | 49 | 0.2 | 40 | — | | — | | 55 | 24 | 72 | 1.28 | amorphous |
| 49 | 50 | 0.1 | 40 | — | | — | | 55 | 24 | 96 | 2.45 | semi-crystalline |
| 50 | 51 | 0.2 | 40 | — | | MgEt$_2$ | 0.01 | 40 | 24 | 85 | 1.83 | amorphous |
| 51 | 52 | 0.1 | 20 | benzene | 20 | — | | 45 | 24 | 59 | 1.48 | do. |
| 52 | 53 | 0.2 | 40 | — | | — | | 55 | 24 | 88 | 1.35 | semi-crystalline |
| 53 | 54 | 0.1 | 40 | — | | — | | 55 | 24 | 42 | 1.85 | do. |

EXAMPLE 3

The results of polymerizing propylene oxide using the catalysts prepared in Example 1 are given in Table 3. The polymerization method in general was similar to that employed in Example 2. As the monomer, propylene oxide which had been dehydrated to a water content of no more than 15 p.p.m. was used. The resulting polymer was dissolved once in approximately 100 ml of hot acetone containing 0.5 percent of Nocrac NS-6, poured into water, and the precipitate which formed was dried under reduced pressure. The reduced viscosity was measured as a benzene solution at a concentration of 0.1 g/100 ml, at 40°C.

Table 3

| Run No. | Catalyst No. | Catalyst Amount (g) | Monomer Amount (g) | Solvent Type | Solvent Amount (g) | Promotor Molecular formula | Promotor Amount (g) | Reaction temp. (°C) | Reaction time (hr.) | Yield (%) | Reduced viscosity | Remarks |
|---|---|---|---|---|---|---|---|---|---|---|---|---|
| 1 | 1 | 0.15 | 30 | — | | — | | 25 | 20 | 58 | 3.95 | amorphous |
| 2 | 3 | 0.15 | 30 | — | | — | | 25 | 20 | 51 | 1.80 | do. |
| 3 | 6 | 0.15 | 15 | benzene | 15 | — | | 25 | 20 | 45 | 2.65 | do. |
| 4 | 8 | 0.15 | 30 | — | | — | | 25 | 20 | 31 | 1.50 | do. |
| 5 | 9 | 0.15 | 15 | benzene | 15 | — | | 40 | 20 | 99 | 4.95 | do. |
| 6 | 10 | 0.15 | 15 | benzene | 15 | — | | 40 | 20 | 86 | 4.10 | do. |
| 7 | 13 | 0.10 | 15 | — | | — | | 25 | 20 | 72 | 3.30 | do. |
| 8 | 16 | 0.10 | 15 | — | | — | | 25 | 20 | 18 | 0.95 | semi-crystalline |
| 9 | 17 | 0.15 | 15 | n-hexane | 15 | — | | 25 | 20 | 85 | 1.58 | do. |
| 10 | 19 | 0.05 | 30 | — | | — | | 20 | 24 | 92 | 6.05 | do. |
| 11 | 24 | 0.05 | 30 | — | | — | | 25 | 20 | 32 | 3.18 | amorphous |
| 12 | 27 | 0.05 | 15 | benzene | 15 | — | | 25 | 20 | 75 | 3.50 | do. |
| 13 | 29 | 0.05 | 15 | benzene | 15 | — | | 25 | 20 | 65 | 3.83 | do. |
| 14 | 29 | 0.05 | 15 | benzene | 15 | AlEt$_3$ | 0.01 | 25 | 20 | 88 | 5.91 | amorphous |
| 15 | 31 | 0.1 | 15 | benzene | 15 | AlEt$_3$ | 0.01 | 25 | 20 | 75 | 3.10 | do. |
| 16 | 33 | 0.05 | 15 | benzene | 15 | — | | 25 | 20 | 61 | 5.45 | do. |

Table 3—Continued

| Run No. | Catalyst No. | Catalyst Amount (g) | Monomer Amount (g) | Solvent Type | Solvent Amount (g) | Promotor Molecular formula | Promotor Amount (g) | Reaction temp. (°C) | Reaction time (hr.) | Yield (%) | Reduced viscosity | Remarks |
| --- | --- | --- | --- | --- | --- | --- | --- | --- | --- | --- | --- | --- |
| 17 | 33 | 0.05 | 15 | benzene | 15 | AlEt₃ | 0.04 | 25 | 20 | 96 | 9.30 | do. |
| 18 | 33 | 0.10 | 15 | benzene | 15 | MgEt₂ | 0.01 | 20 | 20 | 89 | 7.90 | do. |
| 19 | 38 | 0.1 | 30 | — | | — | | 25 | 20 | 72 | 3.85 | do. |
| 20 | 44 | 0.1 | 30 | — | | — | | 25 | 20 | 78 | 5.00 | do. |
| 21 | 46 | 0.1 | 30 | — | | — | | 25 | 20 | 85 | 6.40 | semi-crystalline |
| 22 | 46 | 0.1 | 15 | benzene | 15 | ZnEt₂ | 0.03 | 10 | 48 | 82 | 7.20 | do. |
| 23 | 47 | 0.15 | 30 | — | | — | | 30 | 20 | 32 | 2.85 | do. |
| 24 | 47 | 0.15 | 30 | — | | AlEt₃ | 0.01 | 30 | 20 | 75 | 3.95 | do. |
| 25 | 52 | 0.1 | 30 | — | | — | | 30 | 20 | 60 | 3.52 | amorphous |

EXAMPLE 4

The results of polymerizing various epoxides using the catalysts prepared in Example 1 are given in Table 4. The polymerization method employed in general was similar to that practiced in Example 2. Ethylene oxide was distilled through a potassium hydroxide-filled column before the polymerization, and other epoxides were dehydrated to the water content of not more than 20 p.p.m. Among the resulting polymers, SO (styrene oxide) and PGE (phenyl glycidyl ether) polyers were washed with ethyl ether containing 0.5 percent of Nocrac NS-6, and dried under reduced pressure, and BO (1-butene oxide), BGE (butyl glycidyl ether) and AGE (allyl glycidyl ether) polymers were washed with methanol or water containing methanol, and dried under reduced pressure. Again EO (ethylene oxide) polymer was filtered, immersed in ethyl ether containing 0.1 percent of Nocrac NS-6, and dried under reduced pressure as it was. The reduced viscosity of EO, BO, AGE and BGE polymers were measured as benzene solutions at a concentration of 0.1 g/100 ml, at 50°C., and that of SO and PGE polymers were measured as monochlorobenzene solutions at a concentration of 0.1 g/100 ml, at 80°C.

Table 4

| Run No. | Catalyst No. | Catalyst Amount (g) | Monomer Type | Monomer Amount (g) | Solvent Type | Solvent Amount (g) | Reaction temp. (°C) | Reaction time (hr.) | Yield (g) | Reduced viscosity | Remarks |
| --- | --- | --- | --- | --- | --- | --- | --- | --- | --- | --- | --- |
| 1 | 9 | 0.08 | EO | 4 | hexane | 36 | 35 | 20 | 89 | 7.2 | crystalline |
| 2 | 19 | 0.08 | EO | 4 | hexane | 36 | 25 | 20 | 88 | 8.8 | do. |
| 3 | 46 | 0.08 | EO | 4 | hexane | 36 | 25 | 20 | 100 | 12.6 | do. |
| 4 | 19 | 0.10 | BO | 40 | — | | 25 | 18 | 72 | 4.8 | amorphous |
| 5 | 33 | 0.05 | BO | 40 | — | | 30 | 18 | 83 | 6.5 | do. |
| 6 | 50 | 0.05 | BO | 40 | — | | 30 | 18 | 92 | 7.9 | do. |
| 7 | 12 | 0.20 | SO | 40 | — | | 40 | 24 | 25 | 0.8 | semi-crystalline |
| 8 | 33 | 0.20 | SO | 40 | — | | 40 | 24 | 71 | 1.8 | do. |
| 9 | 9 | 0.10 | PGE | 40 | — | | 30 | 24 | 85 | 1.4 | do. |
| 10 | 12 | 0.05 | PGE | 40 | — | | 30 | 24 | 42 | 0.9 | do. |
| 11 | 33 | 0.05 | PGE | 40 | — | | 30 | 24 | 95 | 3.1 | do. |
| 12 | 33 | 0.15 | AGE | 40 | — | | 30 | 24 | 28 | 0.3 | amorphous |
| 13 | 50 | 0.15 | AGE | 40 | — | | 30 | 24 | 15 | 0.1 | do. |
| 14 | 46 | 0.10 | BGE | 40 | — | | 30 | 24 | 86 | 1.3 | do. |

EXAMPLE 5

The results of co-polymerizing various epoxides using the catalysts prepared in Example 1 are given in Table 5. Among the monomers subjected to the copolymerization, ethylene oxide was distilled through a potassium hydroxide-filled column, and other monomers were dehydrated to a water content of not more than 15 p.p.m. The monomers to be copolymerized in each run were mixed in advance of being charged into the polymerization tube. Other polymerization procedures generally were similar to those employed in Example 2. The polymerization products of run Nos. 1 through 3 were dissolved in approximately 100 ml each of acetone containing 0.1 percent of Nocrac NS-6, and dried under reduced pressure as they were. The products of Run Nos. 4 through 10 were dissolved in hot acetone containing 0.5 percent of Nocrac NS-6, poured into a large excess of methanol, and the precipitate which formed was dried under reduced pressure. The reduced viscosities of the products of Run Nos. 1 through 3 were measured a benzene solutions at a concentration of 0.1 g/100 ml, at 50°C., and the remainder as monochlorobenzene solutions at a concentration of 0.1 g/100 ml, at 80°C.

All the polymers obtained through Run Nos. 1 through 10 were amorphous, and exhibited excellent rubbery elasticity. By means of titration of iodine value, the allyl glycidyl ether content of the polymer of Run No. 1 was determined to be 8.6 percent, that of the Run No. 2 polymer, 7.0 percent, and that of the Run No. 3 polymer 7.3 percent. Also elementary analysis revealed the chlorine contents of the polymers to be as follows:

Run No. 4 polymer: 26.5 percent,
Run No. 5 polymer: 22.6 percent,
Run No. 6 polymer: 24.0 percent,
Run No. 7 polymer: 27.0 percent,
Run No. 8 polymer: 7.4 percent,
Run No. 9 polymer: 34.6 percent,
Run No. 10 polymer: 18.3 percent.

The yield was expressed by the weight percent of the polymer based on the total weight of the charged monomer.

Table 5

| Run No. | Catalyst No. | Catalyst Amount (g) | Monomer Type | Monomer Amount (g) | Solvent Type | Solvent Amount (g) | Promotor Molecular formula | Promotor Amount (g) | Reaction temp. (°C.) | Reaction time (hr.) | Yield (%) | Reduced viscosity | Remarks |
|---|---|---|---|---|---|---|---|---|---|---|---|---|---|
| 1 | 10 | 0.1 | PO AGE PO | 36 4 37 | | | | | 30 | 24 | 62 | 3.8 | amorphous |
| 2 | 19 | 0.1 | AGE PO | 3 18 | | | | | 30 | 24 | 80 | 5.2 | do. |
| 3 | 33 | 0.1 | AGE EO | 1.5 6 | benzene | 20 | | | 40 | 24 | 94 | 4.9 | do. |
| 4 | 19 | 0.1 | EPCH EO | 34 6 | | | | | 20 | 10 | 23 | 1.8 | do. |
| 5 | 33 | 0.2 | EPCH EO | 34 3 | | | | | 30 | 16 | 18 | 2.4 | do. |
| 6 | 46 | 0.08 | EPCH PO | 17 10 | benzene | 20 | AlEt$_3$ | 0.01 | 15 | 12 | 22 | 3.0 | do. |
| 7 | 33 | 0.1 | EPCH PO | 30 32 | | | AlEt$_3$ | 0.01 | 50 | 24 | 85 | 3.5 | do. |
| 8 | 33 | 0.2 | EPCH EPCH | 8 35 | | | | | 50 | 24 | 96 | 4.3 | do. |
| 9 | 52 | 0.05 | AGE EO | 5 3 | | | | | 60 | 24 | 88 | 1.3 | do. |
| 10 | 46 | 0.08 | PO EPCH | 7 30 | | | | | 25 | 13 | 28 | 3.7 | do. |

EXAMPLE 6

Epichlorohydrin was polymerized in a polymerization tank of 20 liters in capacity, which was made SUS-27 stainless steel and equipped with a stirrer, thermometer and a jacket.

First the atmosphere in the tank was nitrogen-substituted, and into the tank a liquid mixture composed of 3 kg of epichlorohydrin and 12 kg of benzene which had been dehydrated to a water content of not more than 10 ppm was charged. To the system catalyst No. 33 prepared in Example 1 was added as 50 ml of benzene solution (concentration: 0.3 g/1 ml of the solution). The amount of the catalyst in the case was 0.10 percent by weight based on the liquid mixture. Subsequently 2 ml of triethylaluminum were added, and the system was polymerized at 60°C. for 24 hours. To the resulting extremely viscous polymerization liquid 30 g of Nocrac NS-6 were added, and the system was poured into a large excess of methanol. The precipitate which formed was dried at 50°C., to yield 2.5 kg of epichlorohydrin rubber. This raw rubber had a reduced viscosity of 3.05 (80°C., 0.1 g/100 ml, monochlorobenzene), and Mooney viscosity (ML$_{1+4}$100°C) of 71. Also the ash content was 0.45 percent. No crystallinity was recognized when examined by X-ray diffraction and differential scanning calorimeter.

The raw rubber was formed into a blend of the following composition, and the physical properties of the vulcanized product were examined.

Blend composition :

| Component | Part by weight |
|---|---|
| Epichlorohydrin polymer | 100 |
| Trilead tetroxide | 5.0 |
| Zinc stearate | 1.0 |
| 2-Mercaptoimidazoline | 1.5 |
| Nickel dibutyl dithiocarbamate | 1.0 |
| FEF carbon black | 50 |

Vulcanization
  160°C. × 30 minutes
Physical properties
  Tensile strength      151 kg/cm$^2$
  Elongation            410 %
  200 Modulus           121 kg/cm$^2$
  Tear strength         57 kg/cm
  Permanent elongation  4%

—Continued

Rebound elasticity          29%
Aging test (gear system, 150°C. × 96 hrs.)
  Tensile strength variations    + 5.9%
  Elongation variation           −34.2%
Oil resistance test (JIS No. 1 oil, 40°C. × 24 hrs.)
  Volume variation        +0.5
  Weight variation        +0.3
Oil resistance test (isooctane 70 + toluene 30, 40°C. × 24 hrs.)
  Volume viariation       +18.8%
  Weight variation        + 9.3%

EXAMPLE 7

Example 6 was repeated except that 12 kg of the benzene used as the polymerization solvent was replaced by 11 kg of n-hexane. In this run the polymer was obtained as a granular precipitate, without adhering onto the inside walls of the polymerization tank. The polymer was separated by filtration, added to an ethyl ether solution containing 20 g of Nocrac NS-6, and dried as it was at 50°C. Thus an epichlorohydrin rubber was obtained through relatively simple post-treatment.

We claim:

1. In a process for polymerizing or copolymerizing vicinal alkylene oxides in the presence of a catalyst to form the corresponding homo- or copolymers, the improvement wherein the polymerization or copolymerization reaction is performed in the presence of a catalyst comprising the reaction product performed at a temperature of 100°–300°C. by reacting outside of the polymerization system:

I. at least one metal halide selected from the group consisting of a compound of the formula AlX$_3$, wherein X means chlorine or bromine, a compound of the formula MX$_4$, wherein X is as defined above, and M is a metal selected from the group consisting of Ti, Zr, Hf, Si, Ge, and Sn and a compound of the formula SnX$_2$, wherein X is as defined above, with at least one reactant (II) selected from the phosphorus-containing compounds of the following 11 groups:

II.

(1)

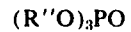

wherein R'' is a member selected from the group consisting of, alkyl of 1–12 carbon atoms, halogenated alkyl of 1–12 carbon atoms, alkenyl of 1–12 carbon atoms, and cycloalkyl of 5–7 carbon atoms which may contain an alkyl or alkenyl side chain of 1–4 carbon atoms, the plural R″'s optionally being the same or different;

(2)

$$Z(R''O)_2PO$$

wherein R″ is as defined in formula (1), Z is a radical selected from the group consisting of alkyl of 1–8 carbon atoms and aryl;

(3)

$$Z_2(R'''O)PO$$

wherein R‴ is a member selected from the group consisting of alkyl of 1–12 carbon atoms, halogenated alkyl of 1–2 carbon atoms, alkenyl of 1–12 carbon atoms, and cycloalkyl of 5–7 carbon atoms which may contain an alkyl or alkenyl side chain of 1–4 carbon atoms, Z is as defined in formula (2), the plural Z's optionally being the same or different;

(4)

$$(R''O)_2\underset{\underset{O}{\|}}{P}-O-\underset{\underset{O}{\|}}{P}(OR'')_2$$

wherein R″ is as defined in formula (1);

(5)

$$(R''O)_2\underset{\underset{O}{\|}}{P}-O-\underset{\underset{O}{\|}}{\overset{\overset{OR''}{|}}{P}}-O-\underset{\underset{O}{\|}}{P}(OR'')_2$$

wherein R″ is as defined in formula (1);

(6)

$$Z-\underset{\underset{O}{\|}}{\overset{\overset{OR''}{|}}{P}}-O-\underset{\underset{O}{\|}}{\overset{\overset{OR''}{|}}{P}}-Z$$

wherein R″ is as defined in formula (1) and Z is as defined in formula (2), the plural Z's optionally being the same or different;

(7)

$$(R''O)_3P$$

wherein R″ is as defined in formula (1);

(8)

$$Z(R''O)_2P$$

wherein R″ is as defined in formula (1) and Z is as defined in formula (2);

(9)

$$Z_2(R'''O)P$$

wherein R‴ is as defined in formula (3) and Z is as defined in formula (2), the plural Z's optionally being the same or different;

(10)

$$(R''O)_2POP(OR'')_2$$

wherein R″ is as defined in formula (1); and

(11) combination of a phosphorus compound selected from the group consisting of a phosphorus oxide and compounds containing a phosphorus-halogen linkage, with a compound selected from the group consisting of aliphatic alcohols of 1–12 carbon atoms, aliphatic polyhydric alcohols of 1–12 carbon atoms, epoxids derived from olefins of 2–12 carbon atoms, and dialkyl ethers of 4–8 carbon atoms, provided that when a dialkyl ether is used, said phosphorus oxide is selected as the phosphorus compound, the combination of components forming the esters of oxyacids of phosphorus or P—O—C linkage as the reaction products.

2. The process of claim 1, wherein aluminum trichloride is used as the reactant (I), and a compound of formula (1) in which R″ is an organic radical selected from the group consisting of alkyl of 1–12 carbons and halogenated alkyl of 1–12 carbons is selected as reactant (II).

3. The process of claim 1, wherein M is selected from the group consisting of Ti, Zr Hf and Sn and is selected as reactant (I), and a compound of formula (1) in which R″ is an organic radical selected from the group consisting of alkyl of 1–12 carbons and halogenated alkyl of 1–12 carbons is used as reactant (II).

4. The process of claim 1, wherein a tin dihalide in which X is selected from the group consisting of chlorine and bromine is used as reactant (I), and a compound of formula (1) in which R″ is an organic radical selected from the group consisting of alkyl of 1–12 carbons and halogenated alkyl of 1–12 carbons, is used as reactant (II).

5. The process of claim 2, wherein the compound of formula (1) as reactant (II) is replaced by the combination of group (11) wherein phosphorus oxyhalide of the formula $POX_3$ (in which X stands for halogen atom) is selected as the compound containing phosphorus-halogen linkage, in combination with the P—O—C linkage-forming component of an aliphatic alcohol of 1–12 carbons.

6. The process of claim 3, wherein the compound of formula (1) as reactant (II) is replaced by the combination of group (11) wherein a phosphorus oxyhalide of the formula, $POX_3$ (in which X stands for halogen atom) is used as the compound containing phosphorus-halogen linkage, in combination with the P—O—C linkage component of an aliphatic alcohol of 1–12 carbons.

7. The process described in claim 4 wherein the compound of formula (1) as reactant (II) is replaced by the combination of group (11) wherein a phosphorus oxyhalide of the formula, $POX_3$ (in which X stands for halogen atom) is used as the compound containing phosphorus-halogen linkage, in combination with the P—O—C linkage-forming component of an aliphatic alcohol of 1–12 carbons.

8. The process of claim 1 wherein an aromatic hydrocarbon is used as the solvent for homopolymerization of epichlorohydrin or copolymerization of epichlorohydrin with other alkylene oxides.

9. The process of claim 1, wherein an aliphatic or alicyclic hydrocarbon is used as the solvent for homopolymerization of epichlorohydrin or copolymerization of epichlorohydrin with other alkylene oxides.

* * * * *

UNITED STATES PATENT AND TRADEMARK OFFICE
CERTIFICATE OF CORRECTION

PATENT NO. : 3,880,779
DATED : April 29, 1975
INVENTOR(S) : UNOURA, ET AL.

It is certified that error appears in the above-identified patent and that said Letters Patent are hereby corrected as shown below:

Claim 1, column 25, line 18, delete "1-2", insert -- 1-12 --

*Signed and Sealed this*

*Twenty-first Day of September 1976*

[SEAL]

Attest:

RUTH C. MASON
*Attesting Officer*

C. MARSHALL DANN
*Commissioner of Patents and Trademarks*